(12) United States Patent
Spellman et al.

(10) Patent No.: US 9,186,849 B2
(45) Date of Patent: Nov. 17, 2015

(54) COMPOSITE PART MANUFACTURING COMPENSATION SYSTEM AND METHOD

(76) Inventors: Michael Spellman, Rivervale, NJ (US); Jeff Godfrey, Warrensburg, MO (US); Gregory MacLean, Old Tappan, NJ (US)

( * ) Notice: Subject to any disclaimer, the term of this patent is extended or adjusted under 35 U.S.C. 154(b) by 157 days.

(21) Appl. No.: 12/965,786

(22) Filed: Dec. 10, 2010

(65) Prior Publication Data

US 2015/0165674 A1    Jun. 18, 2015

Related U.S. Application Data

(60) Provisional application No. 61/285,191, filed on Dec. 10, 2009.

(51) Int. Cl.
  *G06F 19/00* (2011.01)
  *B29C 69/00* (2006.01)
  *B29L 9/00* (2006.01)

(52) U.S. Cl.
  CPC ........... *B29C 69/005* (2013.01); *B29L 2009/00* (2013.01)

(58) Field of Classification Search
  CPC ....... G01B 11/00; B29C 70/38; B29C 69/005
  USPC ......................................................... 700/98
  See application file for complete search history.

(56) References Cited

U.S. PATENT DOCUMENTS

| | | | | |
|---|---|---|---|---|
| 4,848,137 A | * | 7/1989 | Turner et al. | 73/1.81 |
| 5,341,183 A | * | 8/1994 | Dorsey-Palmateer | 353/122 |
| 5,450,147 A | * | 9/1995 | Dorsey-Palmateer | 353/28 |
| 5,651,600 A | * | 7/1997 | Dorsey-Palmateer | 353/122 |
| 6,000,801 A | * | 12/1999 | Dillon et al. | 353/28 |
| 6,547,397 B1 | * | 4/2003 | Kaufman et al. | 353/28 |
| 6,843,565 B2 | * | 1/2005 | Evans et al. | 353/28 |
| 6,907,651 B1 | * | 6/2005 | Fisher et al. | 29/407.05 |
| 7,241,981 B2 | * | 7/2007 | Hofmann | 250/201.1 |
| 7,268,893 B2 | * | 9/2007 | Palmateer | 356/601 |
| 2001/0046323 A1 | * | 11/2001 | Cork et al. | 382/203 |
| 2003/0090025 A1 | * | 5/2003 | Nelson et al. | 264/162 |
| 2004/0217497 A1 | * | 11/2004 | Engwall et al. | 264/40.1 |
| 2005/0082262 A1 | * | 4/2005 | Rueb et al. | 219/121.6 |
| 2006/0191622 A1 | * | 8/2006 | Ritter et al. | 156/64 |
| 2008/0164376 A1 | * | 7/2008 | Kato et al. | 244/132 |
| 2010/0112190 A1 | * | 5/2010 | Drewett et al. | 427/9 |

* cited by examiner

*Primary Examiner* — Michael D Masinick
(74) *Attorney, Agent, or Firm* — Ferdinand IP, LLC

(57) ABSTRACT

A method and system for assisting in the manufacture of composite parts such as those used for various high-strength assemblies such as aircraft wings, vertical stabilizers, racing car shells, boat hulls, and other parts which are required to have a very high strength to weight ratio. The system uses laser technology to measure the resultant surfaces of a first manufactured composite part. A computer system analyzes and compares the as-built dimensions with the required production specifications. Supplemental composite filler plies are designed including shape and dimensions. These plies are nested together into a single composite sheet and manufactured to minimize wasted material. The plies are then cut out and applied to the first part guided by a laser projection system for locating the plies on the part. The part is then re-cured. The final assembly is then re-measured for compliance with production dimensions.

20 Claims, 19 Drawing Sheets

COMPOSITE PART MANUFACTURING COMPENSATION SYSTEM AND METHOD

CROSS REFERENCES TO RELATED APPLICATIONS

This non-provisional patent application claims a priority benefit to U.S. Provisional Application No. 61/285,191 entitled "COMPOSITE MANUFACTURING PLY COMPENSATION SYSTEM AND METHOD" filed in the United States Patent and Trademark Office on Dec. 10, 2009 by a common Inventor to this instant application, Michael Spellman. Further the above named Provisional Application in its entirety is hereby incorporated by reference.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fabrication and manufacture of composite parts, and more particularly to a system for measuring manufactured dimensions of a first as-built part and generating additional uniquely shaped plies for layup and re-curing so that the final part meets production requirements.

SUMMARY OF THE INVENTION

A laser radar measuring system scans and captures the surface geometry of a first build of a composite part. The as-built measurement data is compared against production specifications. Additional plies of composite material are then designed for placement on the sub-standard part. The plies may be layered and tapered depending on the area to be built up. Once the plies are calculated, they are laid out in an optimum manner on a composite material sheet for markup and cutting. This nesting saves material costs by putting the plies together in a layout that creates the least amount of waste. The plies are then located onto the as-built part guided by lasers for precise location. The as-built part and additional plies are then cured together. Finally the revised part is re-measured to confirm that the newly as-built dimensions are within production tolerances.

The advantages and features discussed above and other advantages and features will become apparent from the detailed description of the best mode for carrying out the invention that follows.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 7B shows and composite airfoil being worked on;

DETAILED DESCRIPTION OF THE EMBODIMENT

Figure 1:
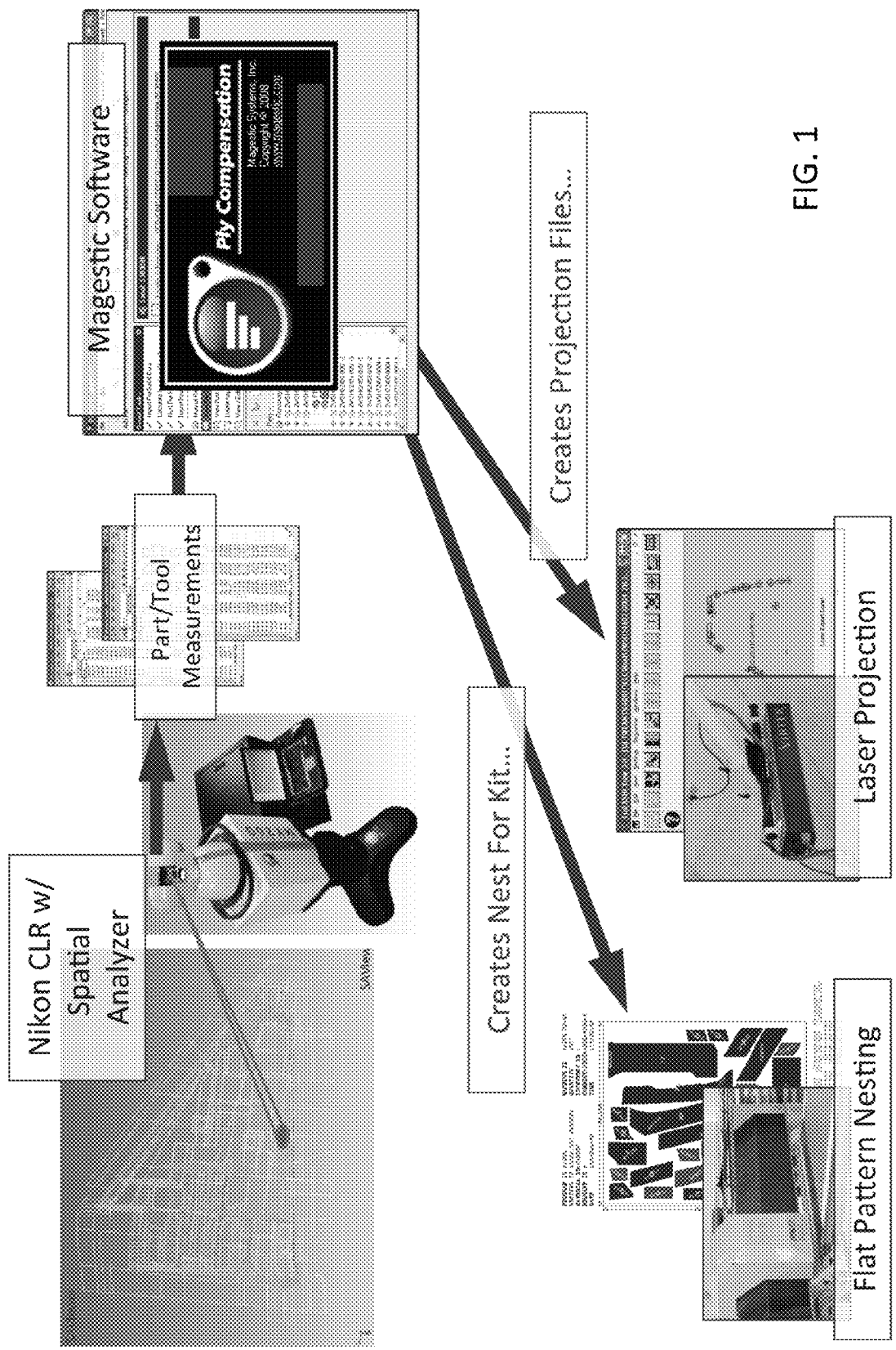
FIG. 1 is a block diagram of the invention.

The basic steps of our invention are:
a) compare the "as-built" composite part data to the "as-designed" specification
b) determine and identify the zones not within engineering tolerances
c) calculate the shape and quantity of compensation plies required to build the part into engineering tolerances
d) automatically nest and cut the compensation plies
e) automatically generate the laser projection files to position compensation plies accurately
f) re-cure the composite part
g) test the finished composite part for compliance with engineering tolerances Referring to FIG. 1, a block diagram illustrating a process overview is shown. First a laser radar scans the surface of an as-built part, and creates a three-dimensional data set representing the surface of the as-built part. The as-built surface is compared with and against a second data set that represents the as-designed surface. A third date is set is created representing the differential dimensions between the as-built surface and the as-designed surface. Any areas which are considered to be out of tolerance are then targeted for ply compensation. The software program using parameter inputs such as ply thickness, fiber orientation, stepping protocol, and other parameters for generating the appropriate number and thickness of plies, creates a series of patterns of plies which are to be cut out of a bolt of the ply cloth for layup on the substandard part.

The nesting software module then takes the series of plies and assembles them into an optimum configuration which when laid out on the ply cloth will minimize material waste. The layout configuration may be printed on thin tracing paper for overlay on the ply cloth or alternatively the patterns may be projected onto the cloth for marking and subsequent cut out.

Once the compensation plies have been cut out from the cloth a laser projection program, illuminates trace patterns on the substandard part to identify the location and orientation for placement of the compensation plies. The part is then cured a second time in an oven. After curing, the part is once again scanned with laser radar to create a new data set to be compared with the ads designed data set.

Finally a quality reporting module compares the second as-built data set with the as-designed data set to generate a report showing the final as-built dimensions in compliance with the design specification.

Figure 2:
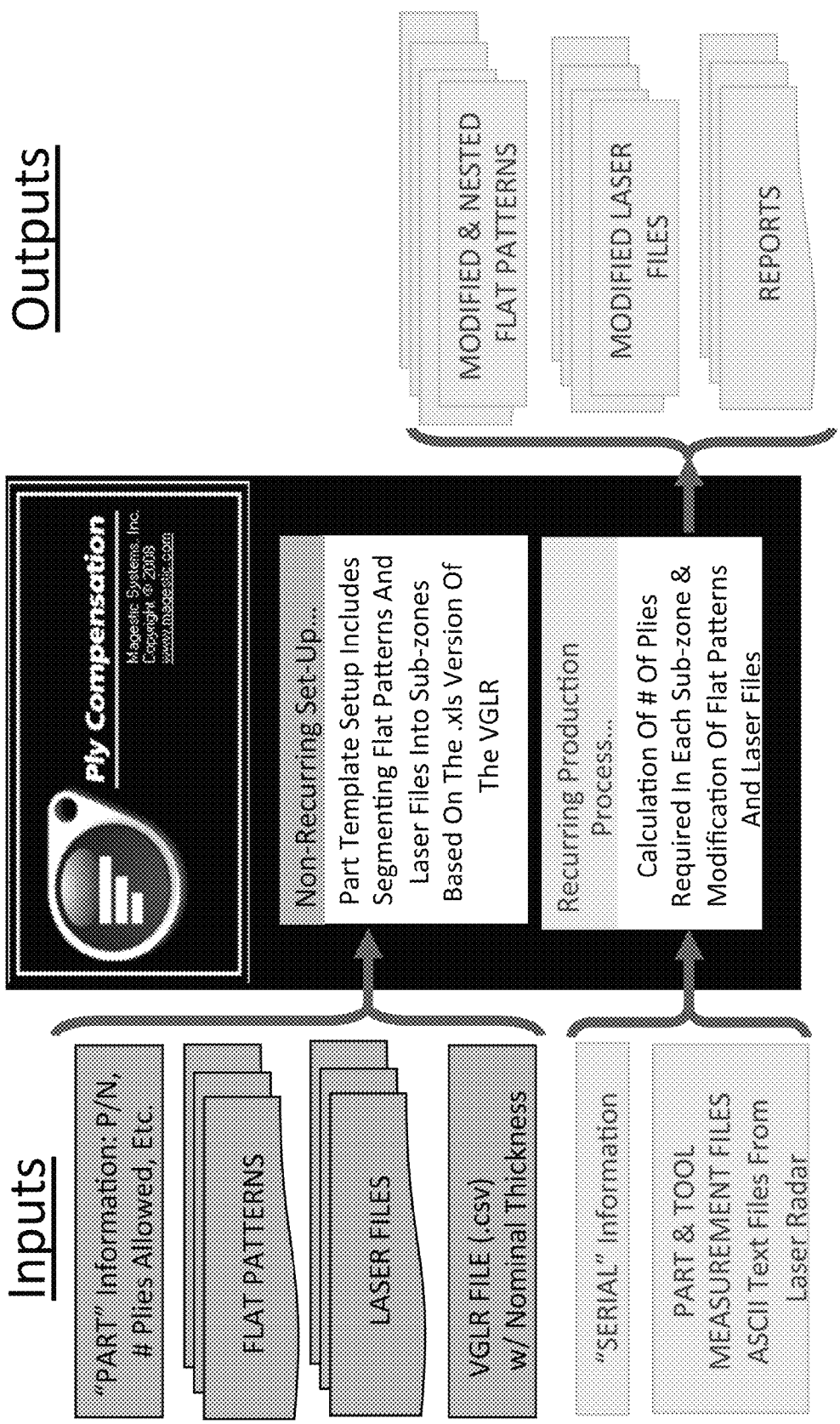
FIG. 2 is a block diagram of the ply compensation software architecture.

Now referring to FIG. 2 a block diagram of the ply compensation software data architecture is shown. The first set of inputs is the non-recurring data which is data particular to the design specifications of the part to be built. The second set of input data is the data collected by the laser radar representing the as-built dimensions and three-dimensional surface of the part being manufactured. The two data sets are compared to determine and locate surface areas that are not within desired tolerances. Those noncompliant areas are then targeted for build up with compensation plies. The compensation plies are shaped so as to match, fill and fit into the noncompliant areas of the composite part. Depending upon the depth and shape of the deficiency, one or more plies may be required in a stacking fashion to fill in that area which is non compliant. Further as plies are stacked, their perimeter dimension may be incrementally reduced or increased as to create the appropriate three-dimensional shape as required by the design specification. Such stacked shaped may be thought of as pyramidal, and depending upon the deficient area, may be right side up or inverted.

The laser files are modified so as to project the areas where the compensation plies will be applied. A multitude of reports are generated to document the manufacturing, surveying, compensation, re-scanning, and final as-built dimensions.

Figure 3:
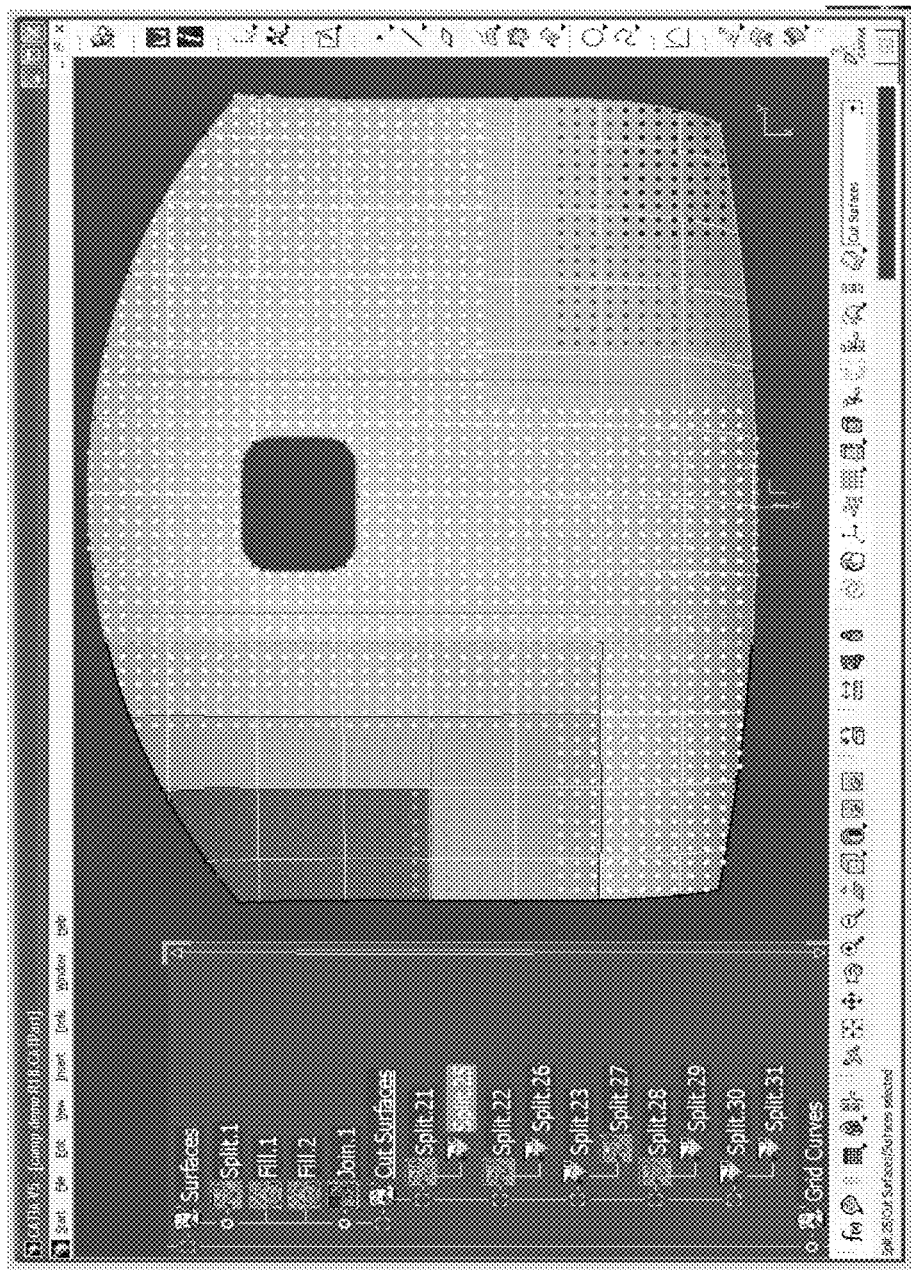
FIG. 3 shows a particular arrangement of the compensation plies being applied to a deficient part.

FIG. 3 shows a particular arrangement of the compensation plies being applied to a deficient part. Note the deficient area being built up on the left-hand side of the part. Several layers of compensation plies are being stacked to bring the composite part within design tolerances. A smaller ply indicated by the red color is stacked upon a larger ply (brown), which is further stacked upon and even larger ply (yellow). This pyramidal stacking brings the substandard part into compliance with the design specification.

Figure 4:
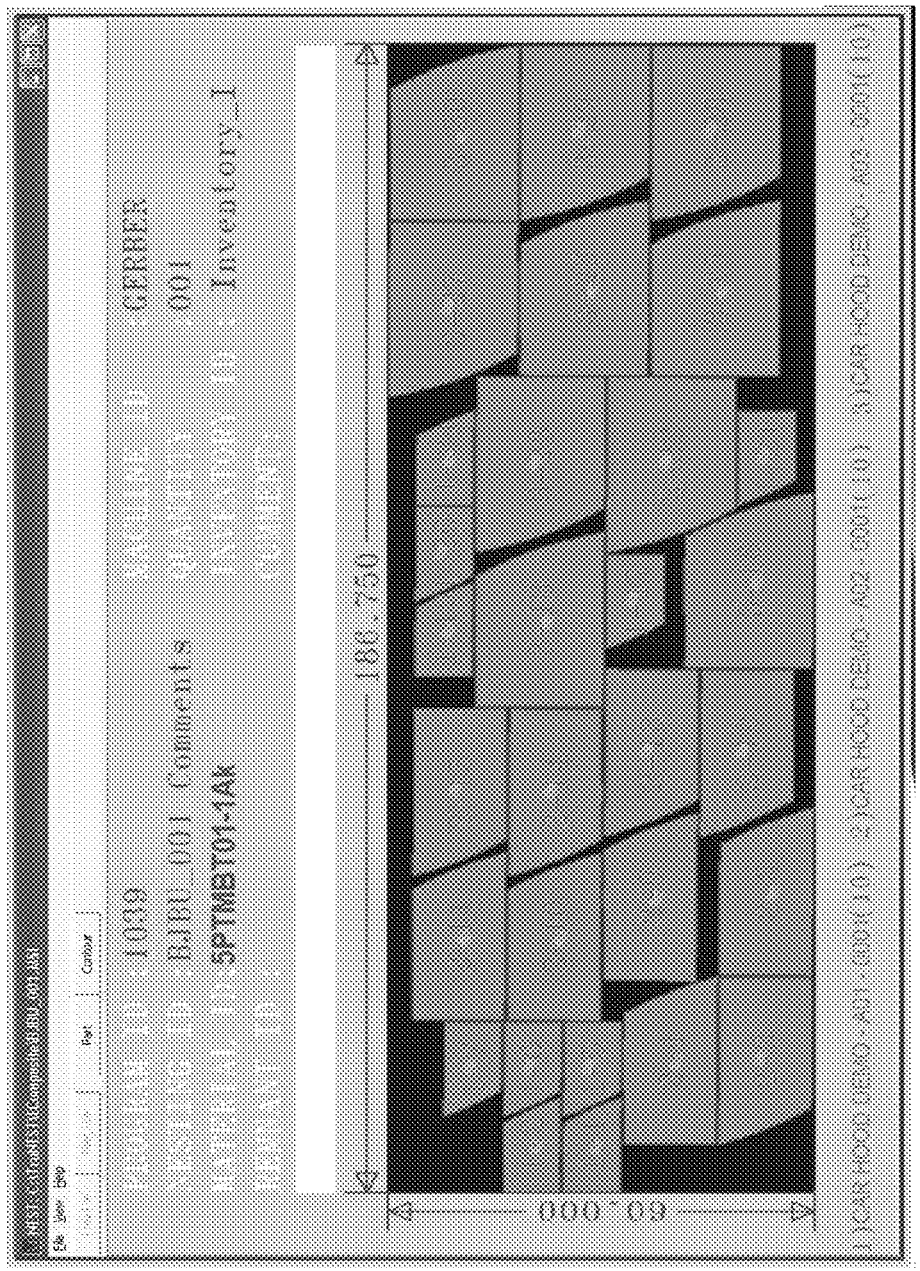
FIG. 4 is a computer screen shot showing how the compensation plies are nested to minimize waste.

FIG. 4 is a computer screen shot showing how the compensation plies are nested to minimize waste. Note that each ply is labeled with a unique number which will be used to identify its location during placement on to the sub-standard part. Also note how the plies have been arranged so as to minimize wasted material after they have been caught from the cloth.

Figure 5:
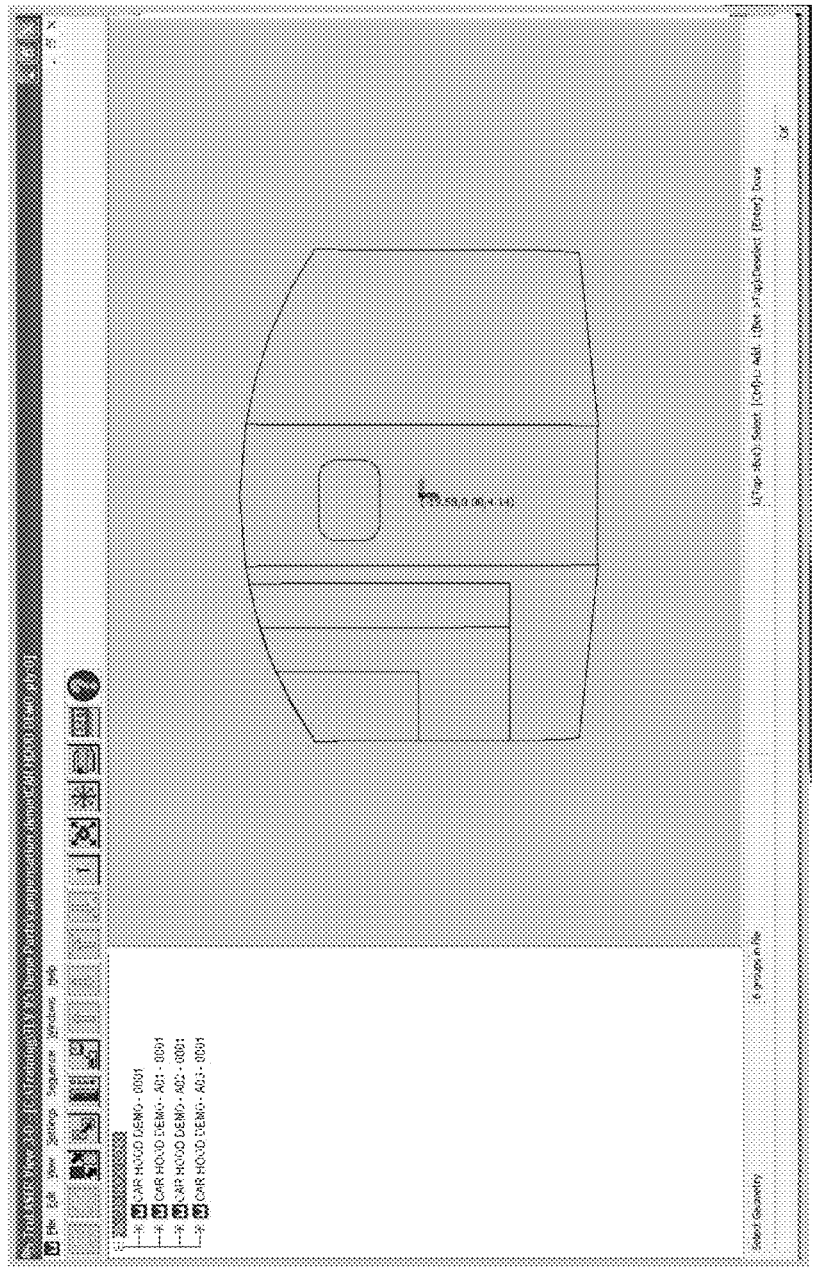
FIG. 5 is a computer screen shot showing the trace paths that the laser projection system will draw on the deficient part to assist in the ply layout.

FIG. 5 is a computer screen shot showing the trace paths that the laser projection system will draw on the deficient part to assist in the ply layout. These are the locations where the plies will be laid on to the substandard part.

Figure 6A:
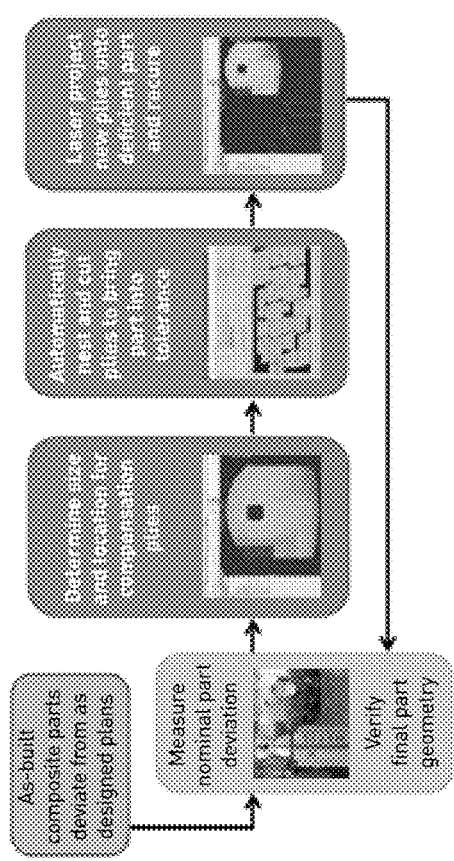
FIG. 6A shows a flowchart for the major processes of the invention.

FIG. 6A shows a block diagram flowchart for the major processes of the invention. The software program is critical to the invention as it collects the standard part data and the substandard part data, compares the two data sets to find deficiencies, determines the size and location for compensation plies, automatically nests the plies to minimize waste of material, generates instructions to cut the plies, generates new laser files to project outlines for placing the plies onto the substandard part, and processes the rescan data after the part has been cured to verify final part compliance.

Figure 6B:
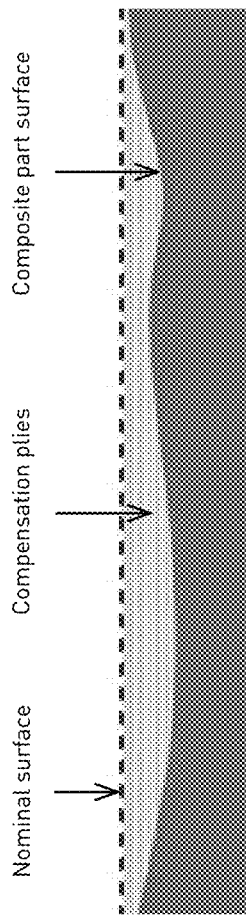
FIG. 6B is a side elevation view of a composite part showing the application of compensation plies to achieve a nominal surface.

FIG. 6B is a side elevation view of a composite part showing the application of compensation plies to achieve a nominal surface. Note the composite part's surface is significantly below the nominal surface which creates the substandard part. The dimensional difference between the nominal surface and the composite part surface exceeds the specified tolerance for the final part. Therefore, in those areas where the as-built part is noncompliant, compensation plies will be shaped and designed to fill in these deficient areas. The addition of the compensation plies will raise the finished surface up to the desired nominal surface, and thus the finished part will be within design tolerances.

Figure 7A:
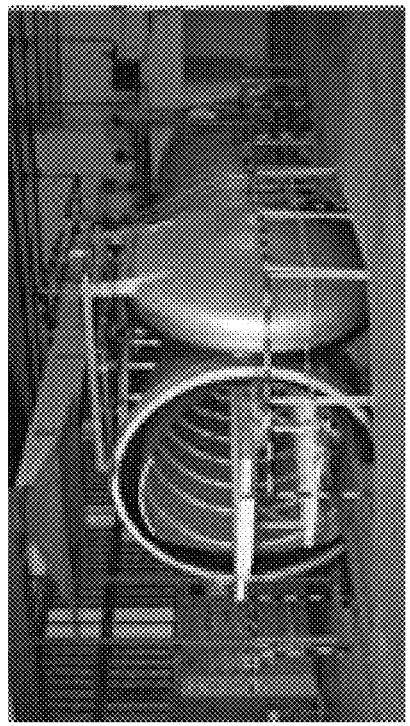
FIG. 7A shows a large industrial kiln for curing composite parts.

FIG. 7A shows a large industrial kiln for curing composite parts. And end cover swings away to open the end of the tubular chamber. Parts to be cured are slid into the oven for a predetermined number of heating cycles.

Figure 7B:

FIG. 7B shows a composite airfoil being worked on. This horizontal stabilizer is a typical airframe part to which this process may be applied.

Figure 7E:
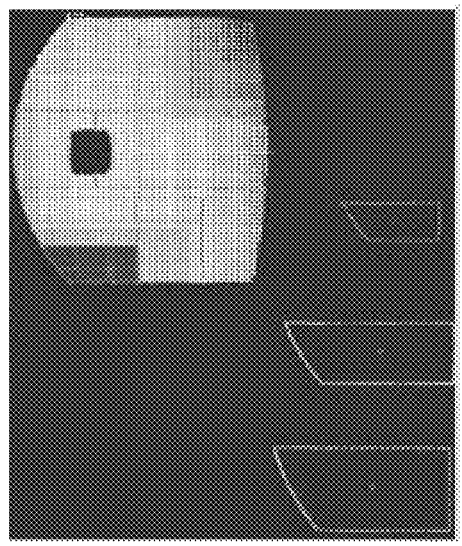
FIG. 7E is a computer screen shot showing the laser projection technology which draws illuminated shapes to assist in the placing and location of the compensation plies.
Figure 7D:
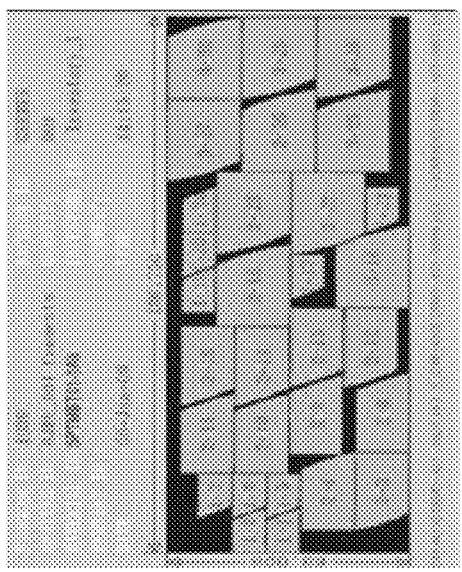
FIG. 7D is a computer screen shot showing how the invention nests the individual plies to minimize material waste.
Figure 7C:
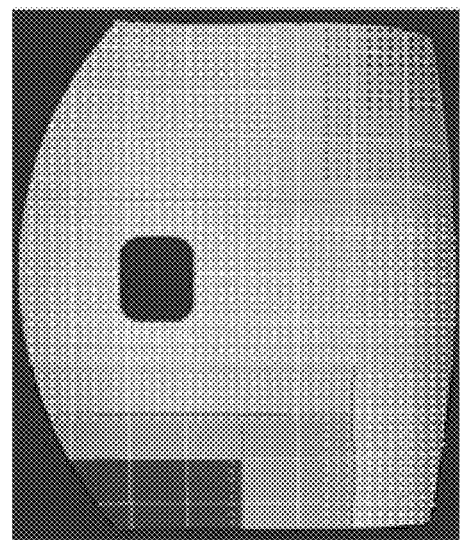
FIG. 7C is a screenshot of the invention performing a calculation to determine the size and location of compensation plies.

FIG. 7C is a screenshot of the invention performing a calculation to determine the size and location of compensation plies. In the lower right-hand corner a series of very thin plies are required to compensate. Different colors are used by the computer program to indicate the thickness required for compensation. The color scheme may be selected and or assigned by the operator.

FIG. 7D is a computer screen shot showing how the invention nests the individual plies to minimize material waste. The nesting program generates the machine code instructions for the CNC machine to perform the cutting operation.

FIG. 7E is a computer screen shot showing the laser projection technology which draws illuminated shapes to assist in the placing and location of the compensation plies. In this figure the individual plies may be viewed separately or in a stacked manner.

Figure 8:
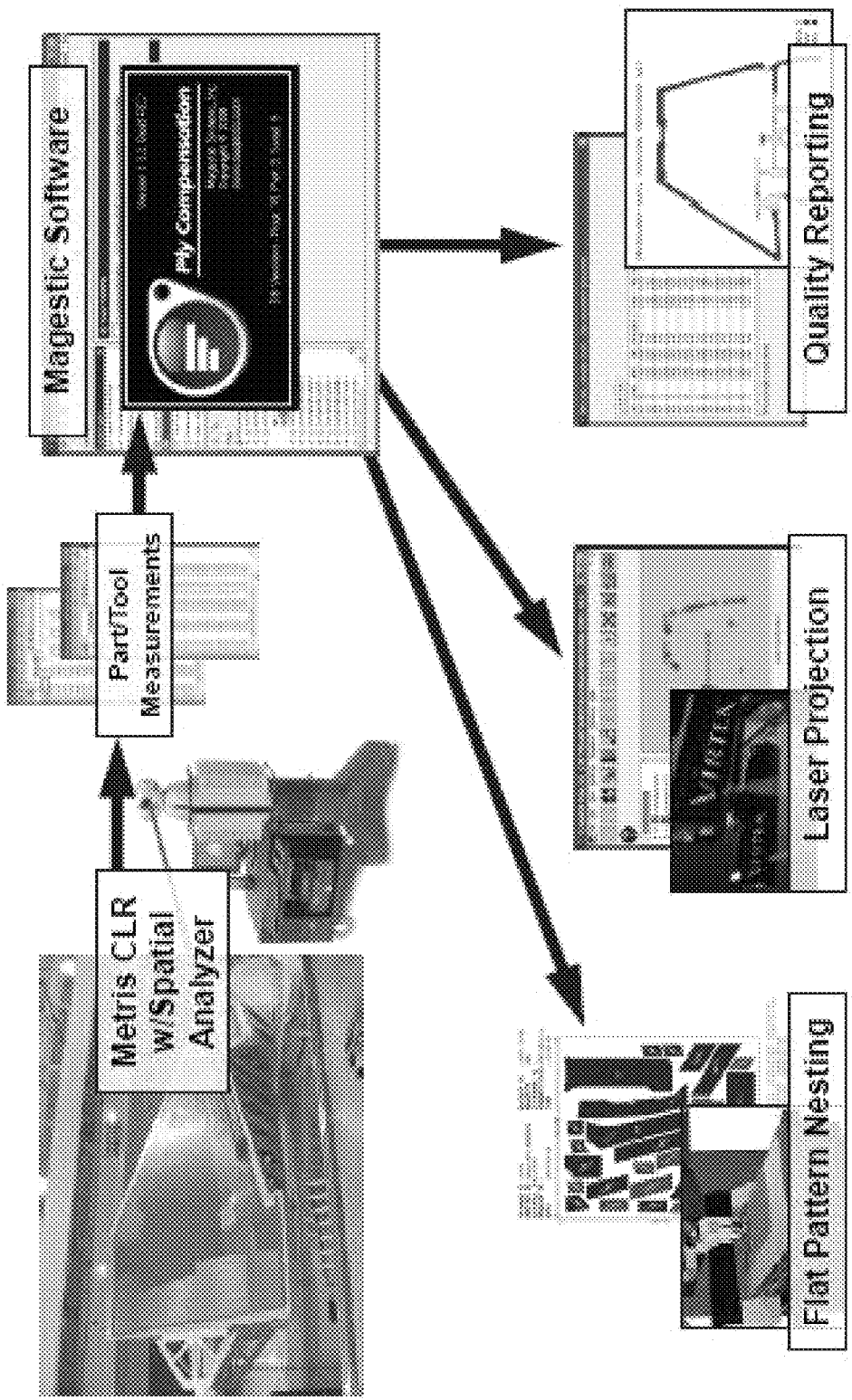
FIG. 8 is a block diagram illustrating the major functional elements of the invention.

FIG. 8 is a block diagram illustrating the major functional elements of the invention.

Figure 9:
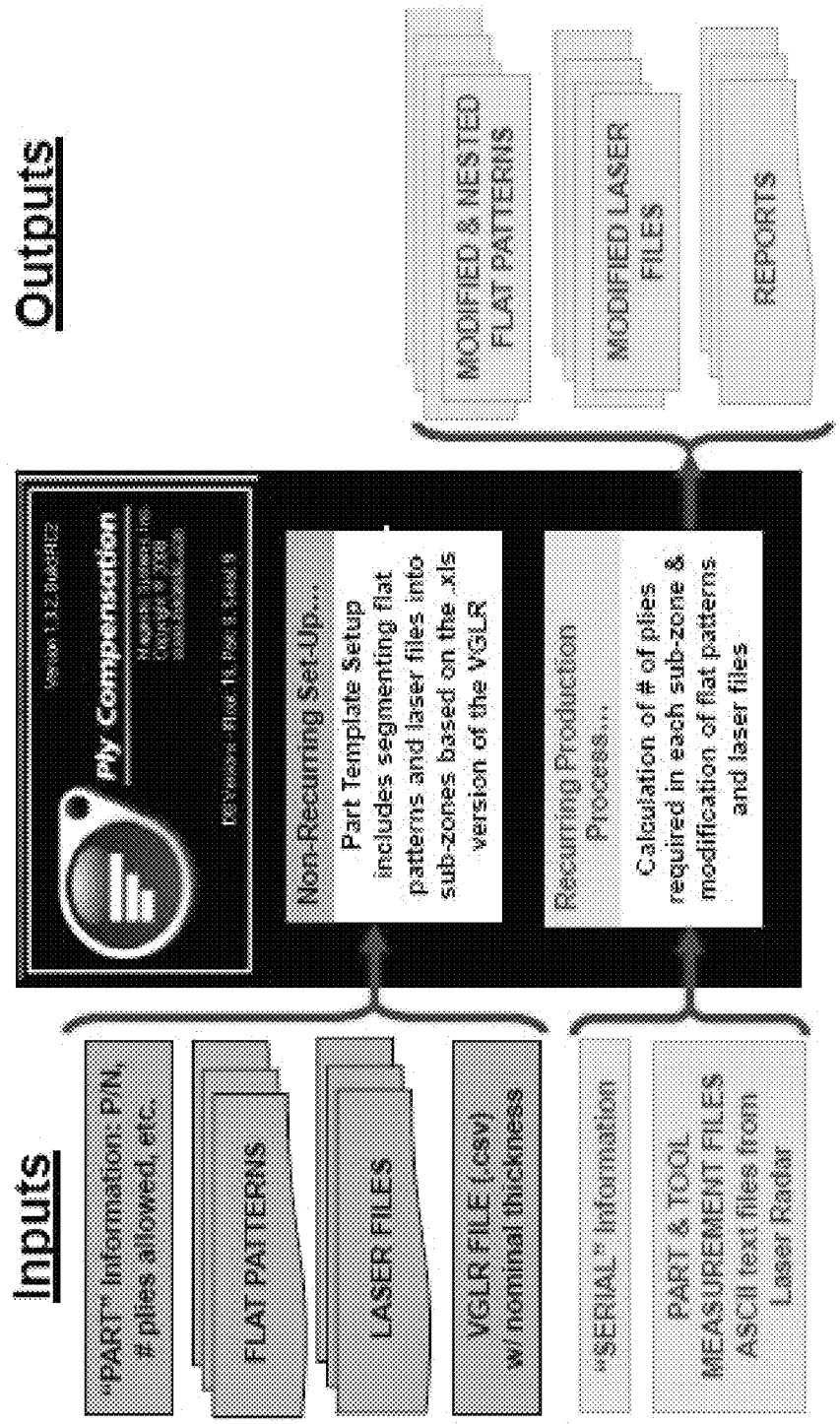
FIG. 9 is a block diagram showing the major architectural components of the ply compensation software.

FIG. 9 is a block diagram showing the major architectural components of the ply compensation software.

Figure 10:
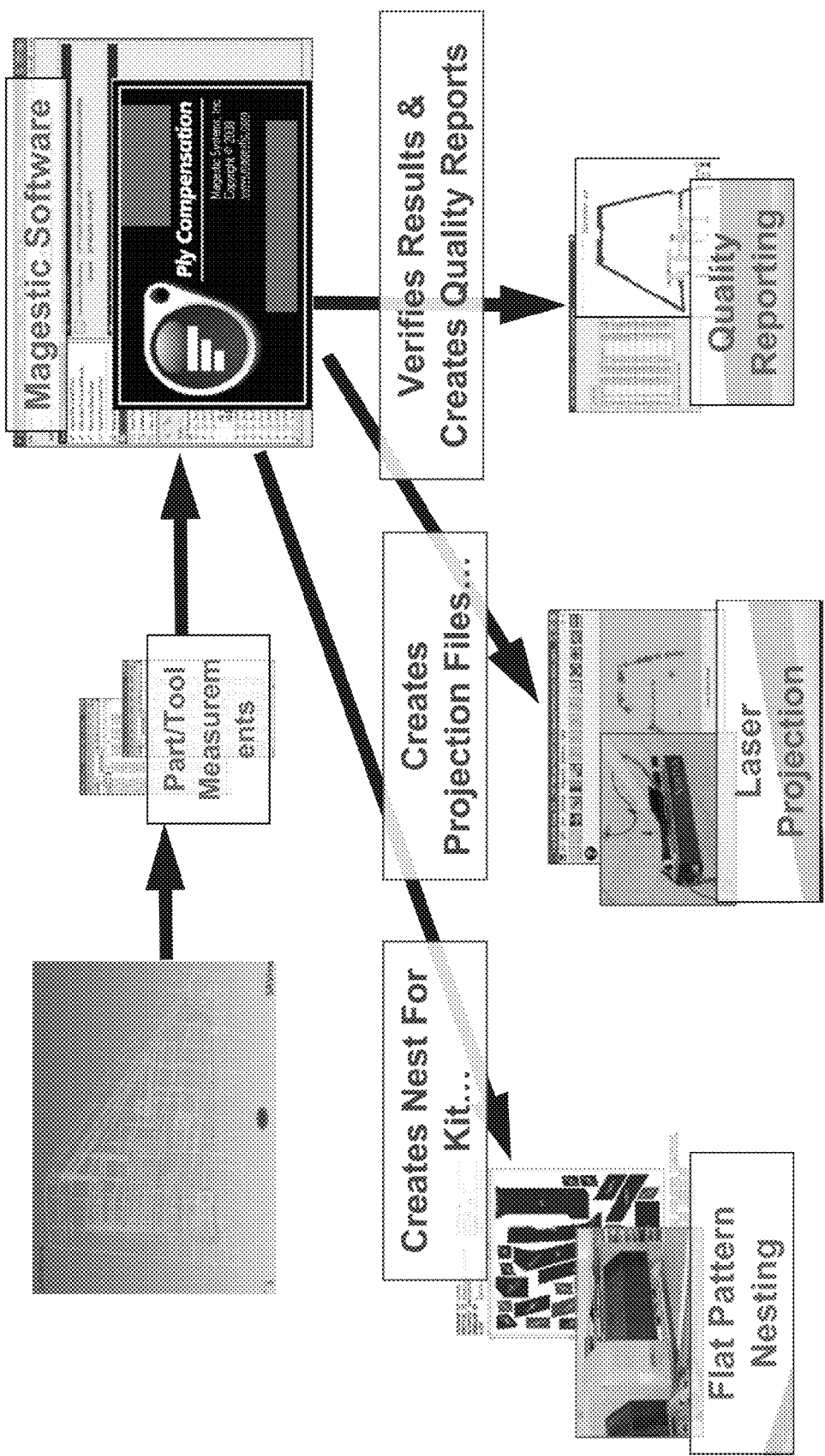
FIG. 10 is a block diagram further illustrating the major functional elements of the invention.

FIG. 10 is a block diagram further illustrating the major functional elements of the invention.

Figure 11:
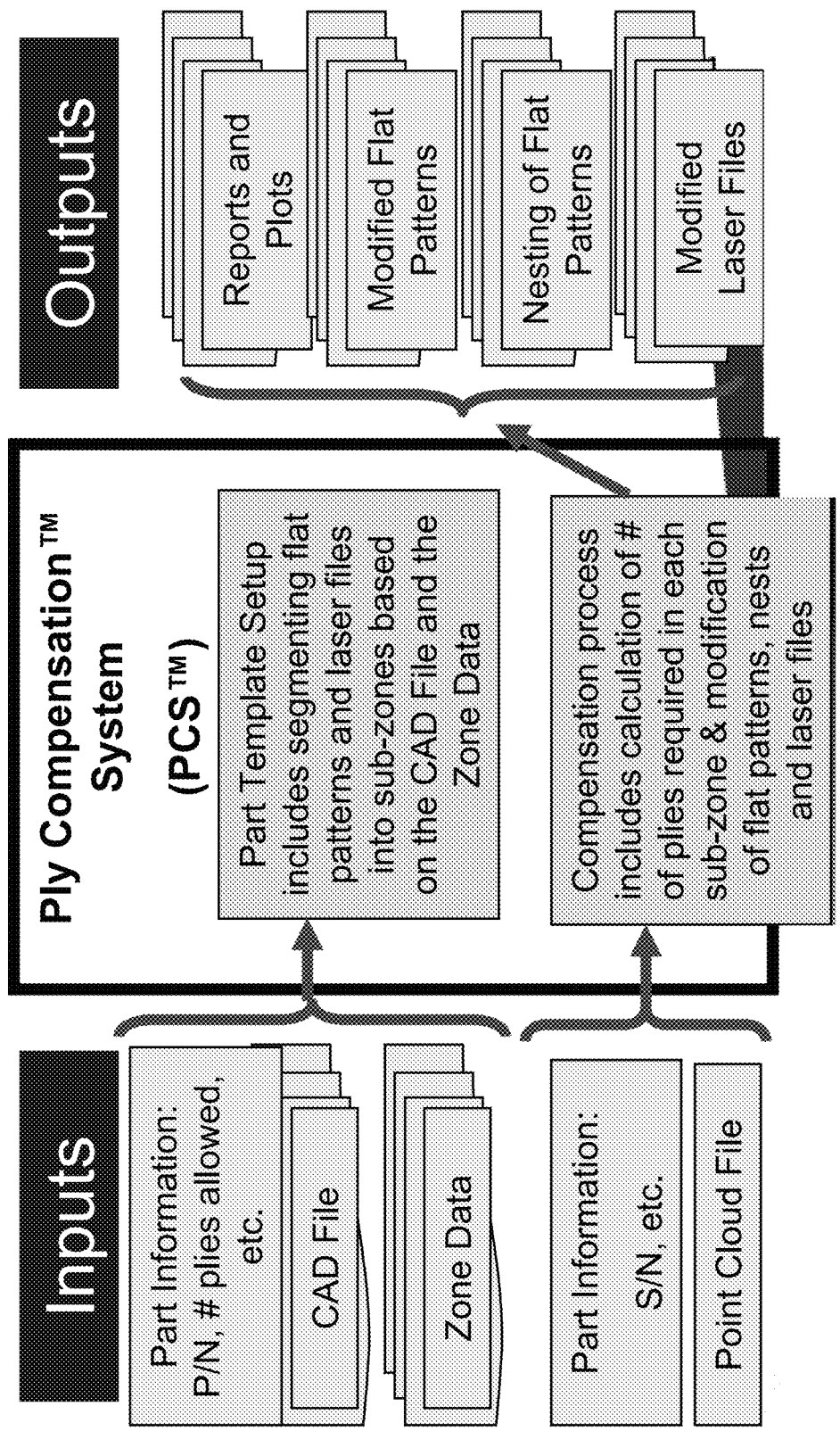
FIG. 11 is a block diagram showing the data flow of the ply compensation program.

FIG. 11 is a block diagram showing the data flow of the ply compensation program.

Figure 12:
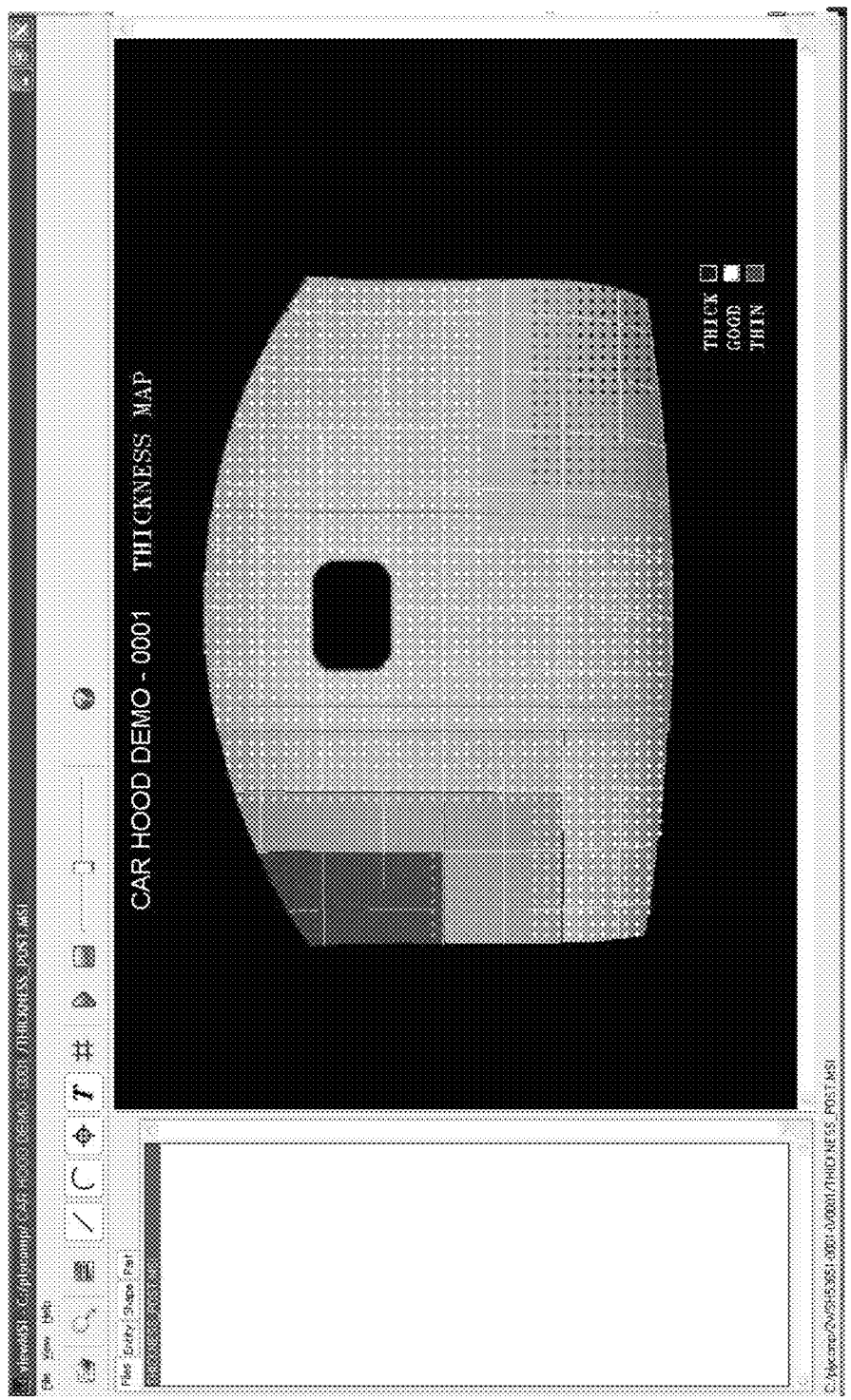
FIG. 12 is a computer screen shot showing the compensation ply analysis.

FIG. 12 is a computer screen shot showing the compensation ply analysis.

Figure 13:
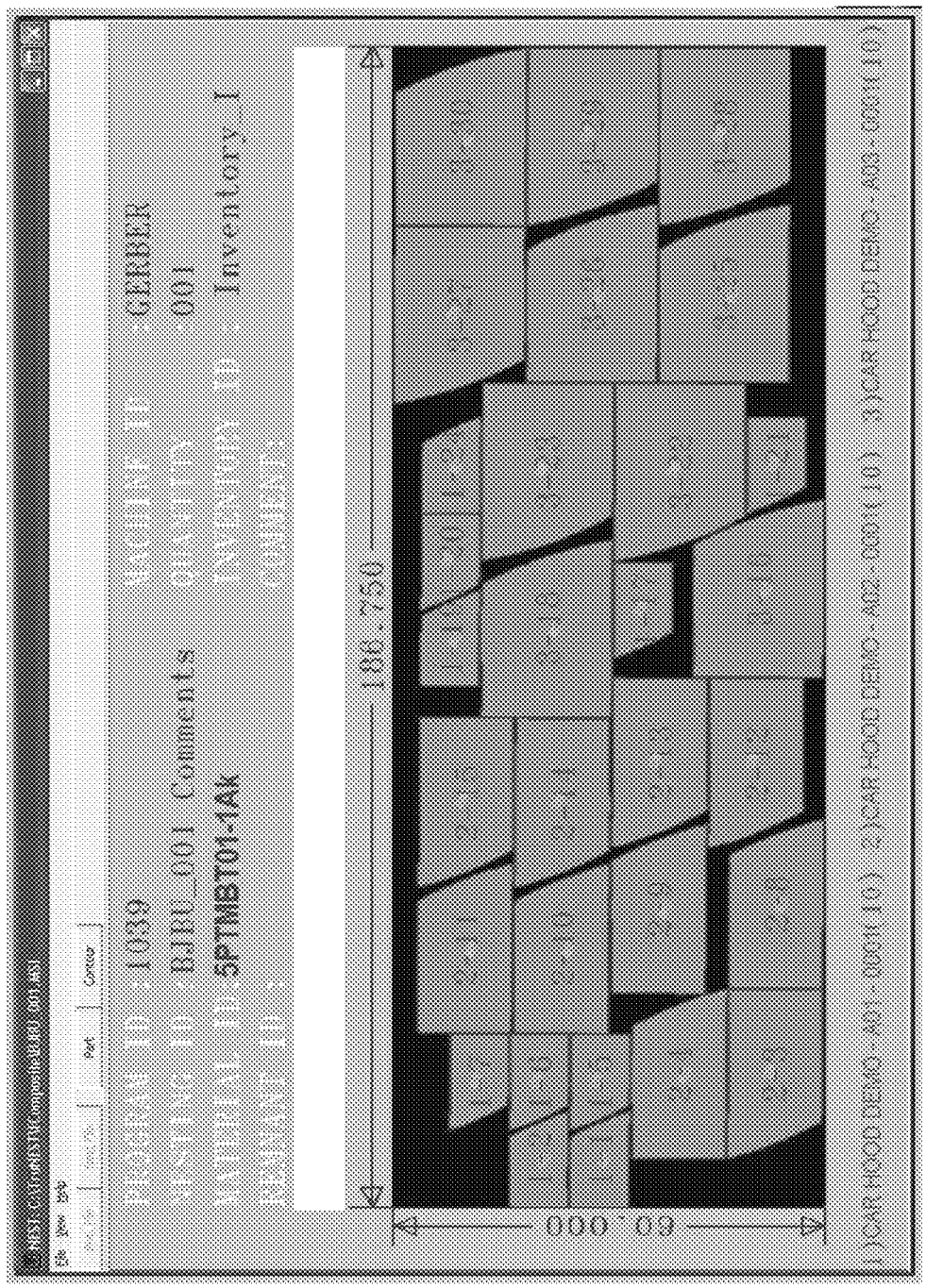
FIG. 13 is a computer screen shot showing the compensation ply layout in a nesting format so as to minimize material waste.

FIG. 13 is a computer screen shot showing the compensation ply layout in a nesting format so as to minimize material waste.

Figure 14:
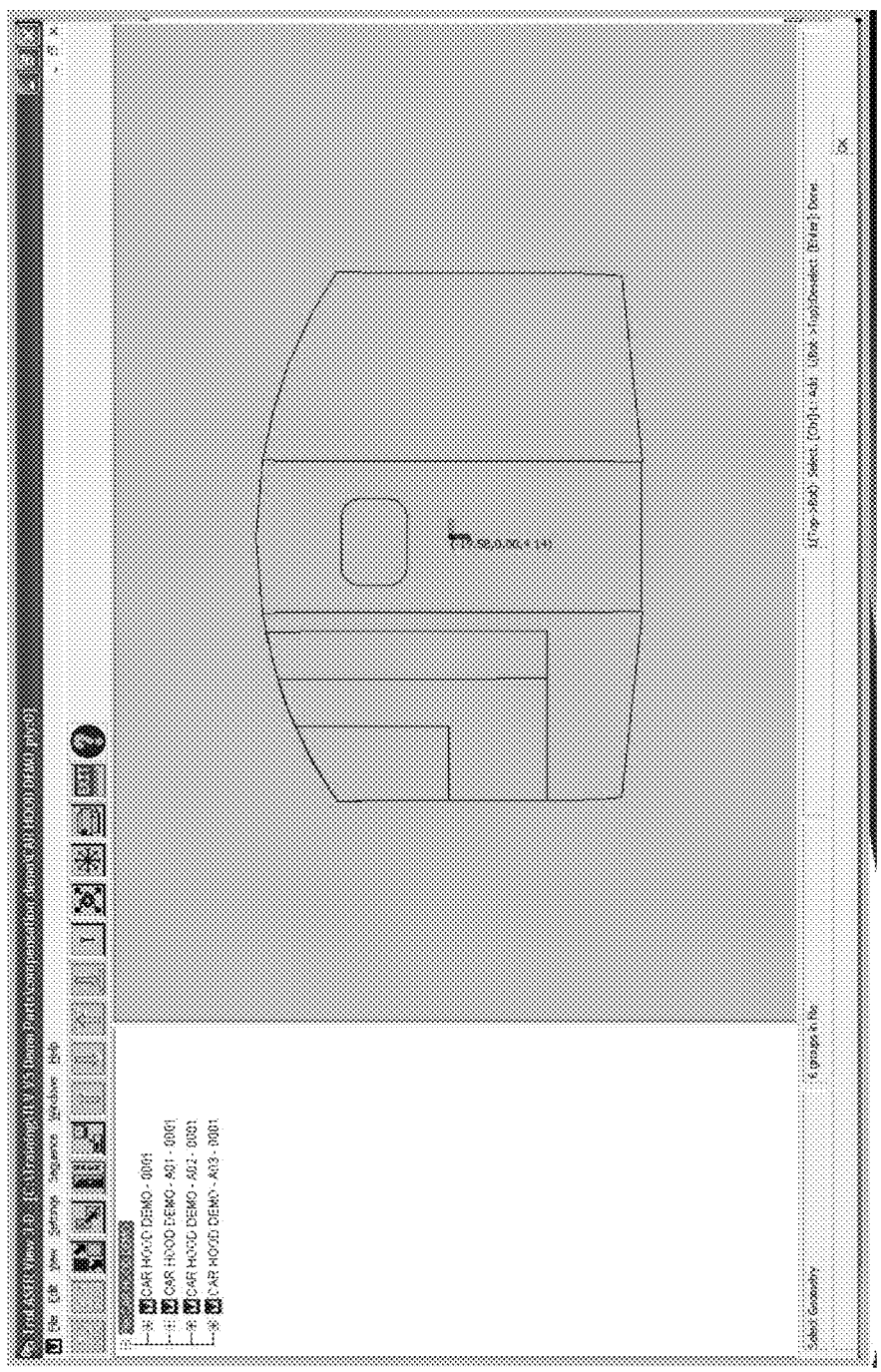
FIG. 14 is a computer screen shot showing the laser projection patterns that will be used to locate and orient the compensation plies as they are laid out on the substandard part.

FIG. 14 is a computer screen shot showing the laser projection patterns that will be used to locate and orient the compensation plies as they are laid out on the substandard part.

Figure 15:
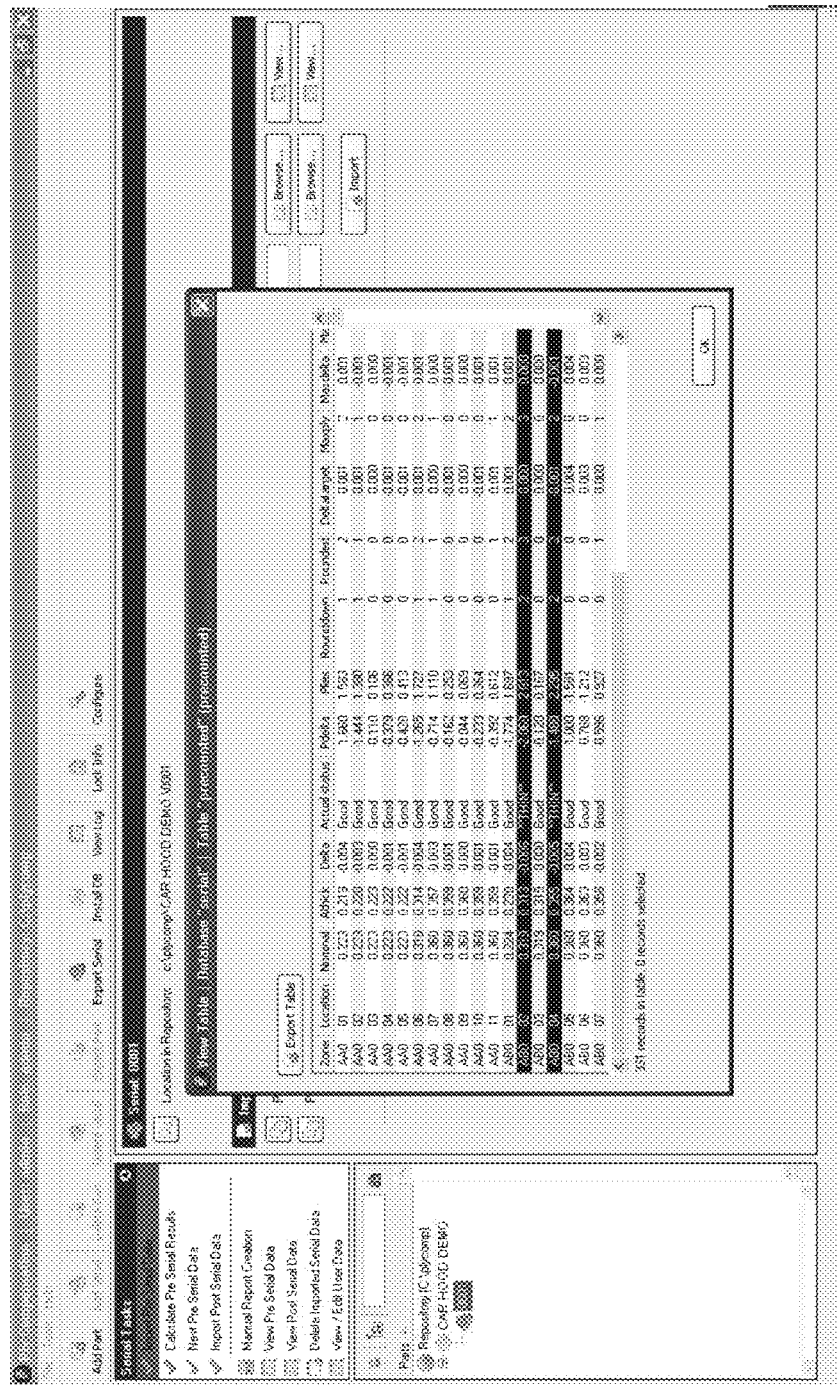
FIG. 15 is a computer screen shot illustrating the reporting feature of the invention.

FIG. 15 is a computer screen shot illustrating the reporting feature of the invention indicating those areas that required ply compensation. Various parameters are recorded and reported such as dimensional data, ply count, discrepancy amount, thickness, location, and orientation (alignment of fibers and/or fabric grain if required).

Figure 16:
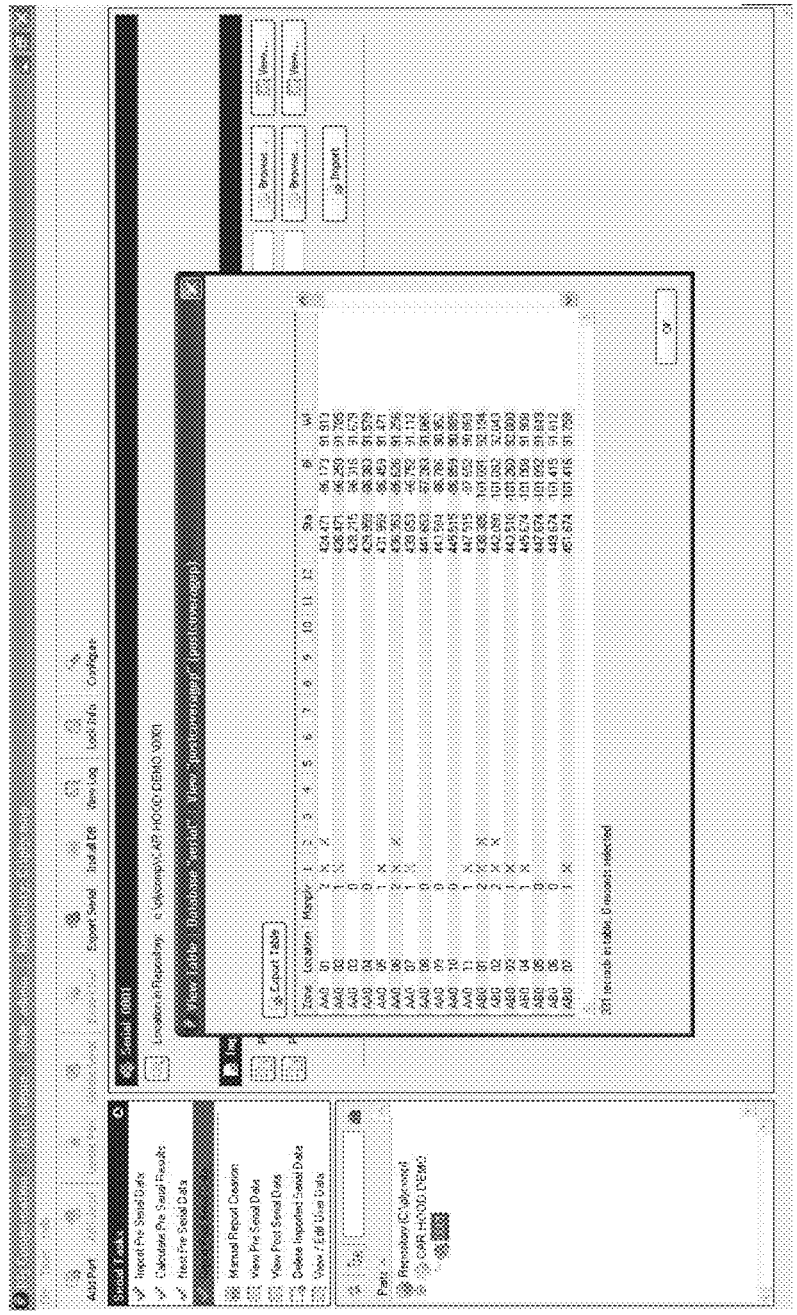
FIG. 16 is a computer screen shot illustrating a coverage map generated by the invention.

FIG. 16 is a computer screen shot illustrating a coverage map generated by the invention. The coverage map may be used to generate and or modify laser files to project location information onto the substandard part for the application of compensation plies. The coverage map may also be used to generate graphical information for the operator and or to support the reporting functions of the invention.

Figure 17:
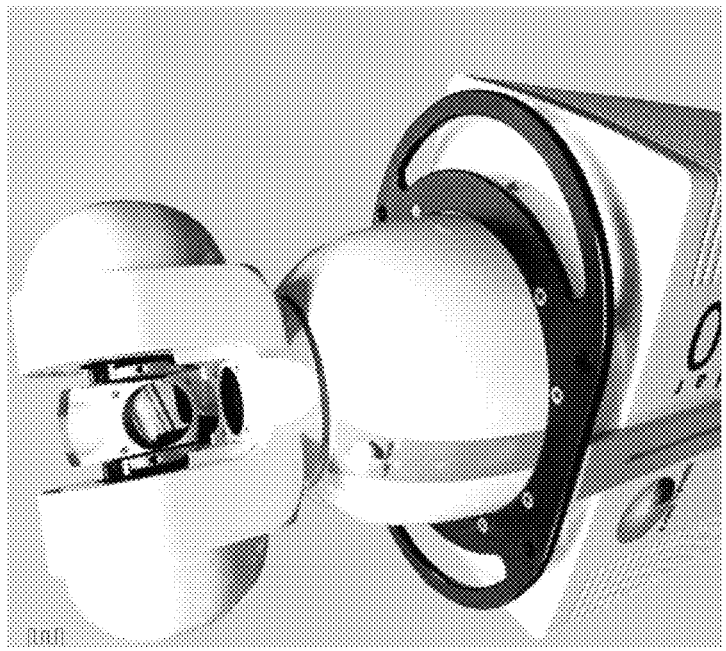
FIG. 17 is a picture of the laser radar system used to generate a data set which represents the as-built dimensions of the composite part.

FIG. 17 is a picture of the laser radar system used to generate a data set which represents the as-built dimensions of the composite part.

Figure 18:
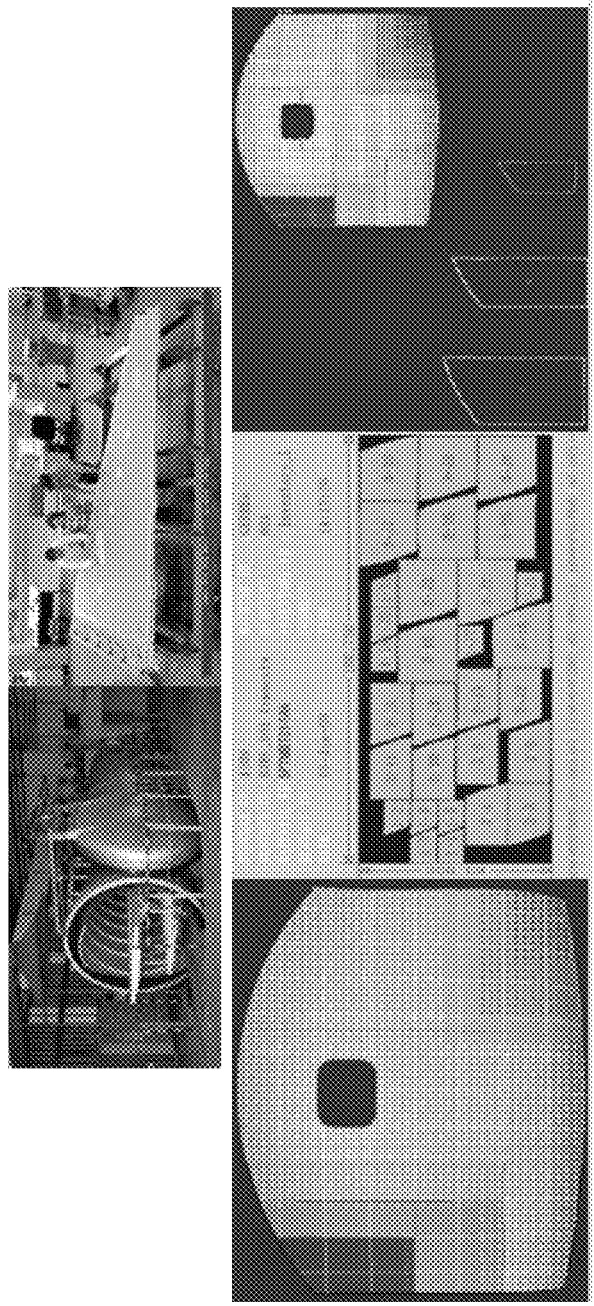
FIG. 18 is a series of photographs showing the invention process.

FIG. 18 is a series of photographs showing the invention process.

Another embodiment of our method is:
a) Compare "As Built" Composite Part to "As Designed"
b) Determine Zones Out of Engineering Tolerances
c) Calculate Shape and Quantity of Compensation Plies Required to Build Part Into Engineering Tolerance
d) Automatically Generate the Nest and NC Code to cut the Compensation Plies
e) Automatically Generate the Laser Projection Files to Position Compensation Plies Accurately
f) Automatically Generate Plots and Reports for Statistical Analysis, Cutting and Laser lay-up process.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Wherefore we claim:

1. A system for assisting in the manufacture of a composite part comprising:
   an input configured to receive three-dimensional surface geometry data set of an as-built composite part;
   a computer module configured to
     compare the surface geometry data set to a data set for the design specifications for the composite part;
     generate a ply shape and dimension differential data set;
     identify at least one area of the as-built composite part that is out of tolerance with the design specifications for the composite part based on the differential data set and generate a compensation data set for one or more compensation plies to be cut from a ply sheet;
     identify the placement location of each compensation ply with respect to the as-built composite part; and
   a nesting module configured to
     determine a composite sheet layout configuration that minimizes waste material of a ply sheet the one or more compensation plies of the compensation data set are cut from; and
     generate instructions for cutting the compensation plies out of the ply sheet.

2. The system of claim 1, further comprising:
   an input configured to receive and store a three-dimensional surface geometry data set of the composite part including the compensation plies;
   the computer module configured to compare the surface geometry data set of the composite part including the compensation plies to the data set for the design specifications for the composite part.

3. The system of claim 2, further comprising:
   a quality reporting module configured to generate a compliance report based on the comparison of the surface geometry data set of the composite part including the compensation plies to the data set for the design specifications for the composite part.

4. The system of claim 1, wherein the three-dimensional surface geometry data set of the first as-built composite part is derived from a laser scan of the as-built composite part.

5. The system of claim 1, wherein said computer module is configured to generate the compensation data set using parameter inputs comprising parameters including at least one of ply thickness, fiber orientation, and stepping protocol.

6. The system of claim 1, wherein said computer module is configured to generate the compensation data set including a number, thickness, and pattern for the one or more compensation plies.

7. The system of claim 1, wherein said computer module is configured to generate the compensation data set by at least:
   determining and locating one or more surface areas are noncompliant with the design specification; and
   generating a data set comprising instructions to shape and place one or more compensation plies to fill the noncompliant surface areas.

8. The system of claim 7 wherein generating the data set further comprises generating instructions to stack a plurality of plies to fill the one or more noncompliant areas.

9. The system of claim 8 wherein the generating the data set further comprises generating instructions to incrementally change one or more perimeter dimensions of one or more of the plurality of plies to create a three-dimensional shape that fills the one or more noncompliant areas.

10. The system of claim 1, wherein the computer module is configured to output the instructions to a laser projection module to configure a laser to illuminate locations on the ply sheet.

11. The system of claim 1, wherein the computer module is configured to output the instructions to a CNC machine to perform the cutting.

12. The system of claim 1, wherein the computer module is configured to generate laser files to project outlines for placing the compensation plies on the as-built part and output the laser files to a laser projection module to configure the laser to illuminate locations on the as-built composite part for applying the compensation plies.

13. A method for manufacturing a composite part with a ply compensation system comprising:
   receiving and storing a three-dimensional surface geometry data set for an as-built composite part into the ply compensation system;
   comparing the surface geometry data set to a data set for the design specifications for the composite part;
   generating a ply shape and dimension differential data set;
   identifying at least one area of the as-built composite part that is out-of-tolerance with the design specification for the composite part based on the differential data set and generating a compensation data set for one or more compensation plies to be cut from a ply sheet;

generating a data set comprising instructions to shape and place one or more compensation plies to fill the at least one out-of-tolerance area;

determining a composite sheet layout configuration that minimizes waste material of a ply sheet that the one or more compensation plies of the compensation data set are to be cut from and generating instructions for cutting the compensation plies out of the ply sheet.

14. The method of claim 13, further comprising:

receiving and storing a three-dimensional surface geometry data set of the composite part including the compensation plies;

comparing the surface geometry data set of the composite part including the compensation plies to the data set for the design specifications for the composite part; and generating a compliance report based on the comparison of the surface geometry data set of the composite part including the compensation plies to the data set for the design specifications for the composite part.

15. The method of claim 13, further comprising generating the compensation data set using parameter inputs comprising parameters including at least one of ply thickness, fiber orientation, and stepping protocol.

16. The method of claim 13 further comprising generating the compensation data set including a number, thickness, and pattern for the one or more compensation plies.

17. The method of claim 16 wherein generating the data set further comprises generating instructions to stack a plurality of plies to fill the one or more out-of-tolerance areas.

18. The method of claim 17 wherein the generating the data set further comprises generating instructions to incrementally change one or more perimeter dimensions of one or more of the plurality of plies to create a three-dimensional shape that fills the one or more noncompliant areas.

19. The method of claim 13, wherein the method comprises:

generating laser files to project outlines for placing the compensation plies on the as-built part and outputting the laser files to a laser projection module to configure the laser to illuminate locations on the as-built composite part for applying the compensation plies.

20. The method of claim 13, wherein the method comprises outputting the instructions to a laser projection module to configure the laser to illuminate cutting locations on a ply sheet.

\* \* \* \* \*